United States Patent [19]

Kadota

[11] Patent Number: 5,657,152
[45] Date of Patent: Aug. 12, 1997

[54] ACOUSTOOPTIC DEVICE

[75] Inventor: Michio Kadota, Kyoto, Japan

[73] Assignee: Murata Manufacturing Co., Ltd., Japan

[21] Appl. No.: 616,528

[22] Filed: Mar. 19, 1996

[30] Foreign Application Priority Data

Mar. 24, 1995 [JP] Japan ................................. 7-091681

[51] Int. Cl.$^6$ ................................. G02F 1/33; G02F 1/035
[52] U.S. Cl. ........................ 359/305; 359/285; 385/2; 385/7; 310/313 D; 310/313 B
[58] Field of Search .............................. 359/305, 285; 385/2, 7, 1; 310/313 D, 313 B

[56] References Cited

U.S. PATENT DOCUMENTS

| | | | |
|---|---|---|---|
| 4,127,320 | 11/1978 | Li | 385/2 |
| 4,418,980 | 12/1983 | Keil et al. | 385/2 |
| 4,544,229 | 10/1985 | Verber | 359/285 |
| 4,544,230 | 10/1985 | Caulfield | 385/2 |
| 5,002,349 | 3/1991 | Cheung et al. | 359/285 |
| 5,083,856 | 1/1992 | Hatori et al. | 385/7 |
| 5,444,322 | 8/1995 | Minami et al. | 310/313 D |

OTHER PUBLICATIONS

Propogation Characteristics of Surface Acoustic Waves in ZnO/LiNbO$_3$ Structures, Jpn. J. Appl. Phys., vol. 32 (1993) pp. 2333–2336, Part 1, No. 5B, May 1993, Kiyoshi Nakamura and Toshiaki Hanaoka.

High Coupling Frequency for Zinc Oxide Overlays on Lithium Niobate Inst. of Elec. & Elecs. Engs., Inc., 1972 Ultrasonics Symposium Proceedings, pp. 370–372, A. Armstrong, et al.

High Efficiency Transducers Having Piezoelectric Bilayer Structure, Proc. the Institute of Electronics and Information Conference, Mar. 1976, K. Ihara, et al.

*Primary Examiner*—Loha Ben
*Attorney, Agent, or Firm*—Ostrolenk, Faber, Gerb & Soffen, LLP

[57] ABSTRACT

An acoustooptic device includes a Y-cut and Z-propagation LiNbO$_3$ substrate or 128°-rotating Y-plane LiNbO$_3$ substrate, an optical waveguide layer which is formed on at least a part of the LiNbO$_3$ substrate and has a higher light refractive index than the LiNbO$_3$ substrate, an interdigital electrode which is formed on the LiNbO$_3$ substrate and generates Rayleigh waves, and a dielectric thin film layer formed on the interdigital electrode.

11 Claims, 5 Drawing Sheets

DIFFRACTED LIGHT BEAMS

NON-DIFFRACTED LIGHT BEAM $f_1$  $f_2$  $f_3$  $f_4$

ACOUSTOOPTIC DEVICE

BACKGROUND OF THE INVENTION

1. Field of the Invention

The present invention relates to an acoustooptic device, and particularly to an acoustooptic device which is preferably used as a light deflecting device for a laser printer or other suitable device.

2. Description of the Related Art

FIG. 7 is a perspective view showing a conventional acoustooptic device, and FIG. 8 is a diagram showing a main part of the acoustooptic device of FIG. 7. The acoustooptic device deflects light beams by using an interaction between light and ultrasonic waves such as surface acoustic waves. The acoustooptic device 1 includes a $LiNbO_3$ layer 2 of Y-cut, and an optical waveguide layer 3 which is formed of a thin film of $Nb_2O_5$ is located on the $LiNbO_3$ layer 2. An input grating 4 is located on the principal plane at a light input side of the optical waveguide layer 3 so as to be substantially perpendicular to a light incident direction. An output grating 5 is located on the principal plane at a light output side of the optical waveguide layer 3 so as to be substantially parallel to the input grating 4. The input grating 4 and the output grating 5 collect spatial light beams into the optical waveguide and combine the spatial light beams. The input grating 4 and the output grating 5 are formed as plural grooves which are parallel to one another, or formed of plural rod-shaped electrodes which are parallel to one another.

Further, an interdigital electrode 6 is located on the principal plane of the optical waveguide layer 3 so that a Rayleigh wave, which is a kind of surface acoustic wave, is excited at the intermediate portion between the input grating 4 and the output grating 5. The interdigital electrode 6 is formed of a pair of comb-shaped electrodes 6a and 6b which are mutually inserted into each other (or interdigitated) as shown in FIG. 8. One comb-shaped electrode 6a is grounded while the other comb-shaped electrode 6b is connected to an oscillator for applying a frequency.

In the acoustooptic device 1, a Rayleigh wave is excited so as to have a frequency corresponding to a frequency applied by the interdigital electrode 6. One light beam is incident from a light source 7 into the optical waveguide layer 3 of the acoustooptic device 1. The light beam which is incident from the light source 7 into the optical waveguide layer 3 is diffracted by the Rayleigh wave which is excited by the applied frequency, so that a different light diffraction (deflection) angle can be obtained by changing the frequency applied to the interdigital electrode 6. The acoustooptic device 1 may be used as a light deflection device for a laser printer or the like.

The variation (variable width) $\Delta\theta$ of a light deflection angle at which the light beam is diffracted in accordance with the variation $\Delta f$ of the frequency is represented by the following equation:

$$\Delta\theta = (\lambda_0 \cdot \Delta f)/(2v \cdot \cos\theta_B) \quad (1)$$

Accordingly, the variation $\Delta\theta$ of the light deflection angle is dependent on the frequency variation $\Delta f$ of the surface acoustic wave. In order to set $\Delta f$ to a large value, it is better to broaden the frequency band of the surface acoustic wave. In order to efficiently excite the surface acoustic wave and thus broaden the frequency band, an electromechanical coupling factor K must be set to a large value.

However, the conventional acoustooptic device as described above has a small electromechanical coupling factor K. For example, in the case of a Rayleigh waveform of a $LiNbO_3$ substrate of Y-cut and Z-propagation, K is theoretically equal to 0.22, and in the case of Rayleigh waveform of a 128°-rotating Y-plane $LiNbO_3$ substrate, K is theoretically equal to 0.23. Therefore, in the conventional acoustooptic device, it is difficult to broaden the frequency band $\Delta f$ of the frequency at which the Rayleigh wave is excited, and it has been impossible to increase the variation (variable width) of the light deflection angle.

SUMMARY OF THE INVENTION

The preferred embodiments of the present invention provide an acoustooptic device in which the efficiency of excitation of a Rayleigh wave is improved and the frequency for the excitation of the Rayleigh wave is broadened, so that the variable width of a light deflection angle is increased.

According to a first preferred embodiment of the present invention, an acoustooptic device includes a Y-cut and Z-propagation $LiNbO_3$ substrate, an optical waveguide layer located on at least a part of the $LiNbO_3$ substrate and having a higher light refractive index than the $LiNbO_3$ substrate, an interdigital electrode located on the $LiNbO_3$ substrate for generating Rayleigh waves, and a dielectric thin film layer located on the interdigital electrode.

In the acoustooptic device as described above, the dielectric thin film layer preferably contains ZnO or $Ta_2O_5$.

In the acoustooptic device as described above, it is preferable that the polarity of the dielectric thin film layer is coincident with the polarity of the $LiNbO_3$ substrate on the confronting surfaces of the dielectric thin film layer and the $LiNbO_3$ substrate.

In the acoustooptic device as described above, a normalized film thickness of the dielectric thin film layer is preferably equal to about 0.37 or less.

According to a second preferred embodiment of the present invention, an acoustooptic device includes a 128°-rotating Y-plane $LiNbO_3$ substrate, an optical waveguide layer which is located on at least the $LiNbO_3$ substrate of 128°-rotating and Y-plane and has a light refractive index higher than the 128°-rotating and Y-plane $LiNbO_3$ an interdigital electrode located on the 128°-rotating Y-plane $LiNbO_3$ for generating Rayleigh waves, and a dielectric thin film layer located on the interdigital electrode.

In the acoustooptic device of the second preferred embodiment as described above, the dielectric thin film layer preferably contains ZnO or $Ta_2O_5$.

In the acoustooptic device of the second preferred embodiment as described above, it is preferable that the polarity of the dielectric thin film layer is coincident with the polarity of the 128°-rotating Y-plane $LiNbO_3$.

In the acoustooptic device of the second preferred embodiment described above, the normalized film thickness of the dielectric thin film layer is preferably equal to about 0.5 or less.

In the acoustooptic device of the first or second preferred embodiments as described above, the optical waveguide layer preferably contains $Nb_2O_5$.

In the acoustooptic device of the first or second preferred embodiments described above, the optical waveguide layer may be formed by diffusing Ti into one principal plane of the $LiNbO_3$ layer.

In the acoustooptic device of the first or second preferred embodiments described above, the optical waveguide layer may be formed by subjecting Ti to proton exchange on one principal plane of the LiNbO₃ layer.

The Rayleigh waveform which is a kind of surface acoustic wave is excited on the LiNbO₃ substrate or the optical waveguide layer by the interdigital electrode located on the Y-cut and Z-propagation LiNbO₃ substrate or 128°-rotating Y-plane LiNbO₃ substrate, the optical waveguide layer being located at least on a part of the Y-cut and Z-propagation LiNbO₃ substrate or 128°-rotating Y-plane LiNbO₃ substrate. By forming the dielectric thin film layer on the interdigital electrode, the electromechanical coupling factor is increased, and the excitation efficiency of the Rayleigh wave is enhanced. In addition, the frequency for the excitation of the Rayleigh wave is broadened.

Further, the polarity of the dielectric thin film layer is coincident with the polarity of the LiNbO₃ substrate (and the optical waveguide layer), whereby the electromechanical coupling efficiency is increased, and the enhancement of the excitation of the Rayleigh wave and the broadening of the frequency band is achieved.

Still further, in the case where the interdigital electrode is located on the Y-cut and Z-propagation LiNbO₃ substrate having the optical waveguide layer on at least a part thereof and further, the dielectric thin film layer is located on the interdigital electrode, the electromechanical coupling efficiency is increased, the excitation efficiency of the Rayleigh wave is enhanced and the frequency band is broadened by setting the normalized film thickness of the dielectric thin film layer to be equal to about 0.37 or less.

In addition, when the dielectric thin film layer contains ZnO or $TaO_5$, the electromechanical coupling efficiency is increased, the excitation efficiency of the Rayleigh wave is enhanced and the frequency band is broadened.

Further, when the 128°-rotating Y-plane LiNbO₃ substrate is used and also the polarity of the dielectric thin film layer is coincident with the polarity of the 128°-rotating Y-plane LiNbO₃ substrate (and the optical waveguide layer), the electromechanical coupling efficiency is increased, the excitation efficiency of the Rayleigh wave is enhanced and the frequency band is broadened.

Still further, in the case where the optical waveguide layer is located on the 128°-rotating Y-plane LiNbO₃ substrate, then the interdigital electrode is located on the optical waveguide layer, and further, the dielectric thin film layer is located on the interdigital electrode, the electromechanical coupling efficiency is increased, the excitation efficiency of the Rayleigh wave is enhanced and the frequency band is broadened by setting the normalized film thickness of the dielectric thin film layer to be equal to about 0.5 or less.

According to the preferred embodiments of the present invention, the electromechanical coupling factor is increased, the excitation of the Rayleigh wave is excited with high efficiency, and the Rayleigh wave is excited at a broad frequency, so that an acoustooptic device having a large variable width of a light deflection angle is obtained.

Other features and advantages of the present invention will become apparent from the following description of the preferred embodiments of the invention which refers to the accompanying drawings.

BRIEF DESCRIPTION OF THE DRAWINGS

The features and advantages of the present invention will be further apparent from the detailed description of preferred embodiments as described below with reference to the following accompanying drawings.

DETAILED DESCRIPTION OF PREFERRED EMBODIMENTS

A preferred embodiment according to the present invention will be described hereinafter with reference to the accompanying drawings.

Figure 1:
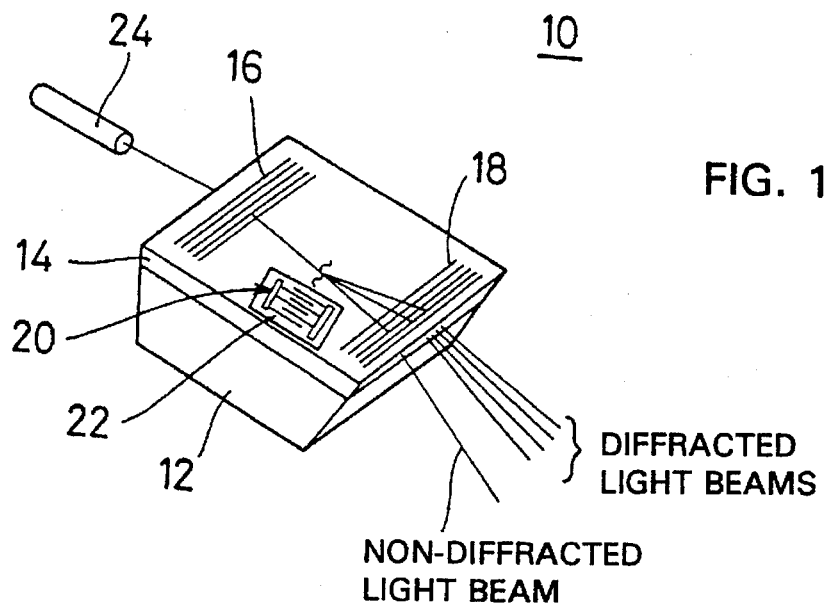
FIG. 1 is a perspective view showing a preferred embodiment of the present invention.
Figure 2:
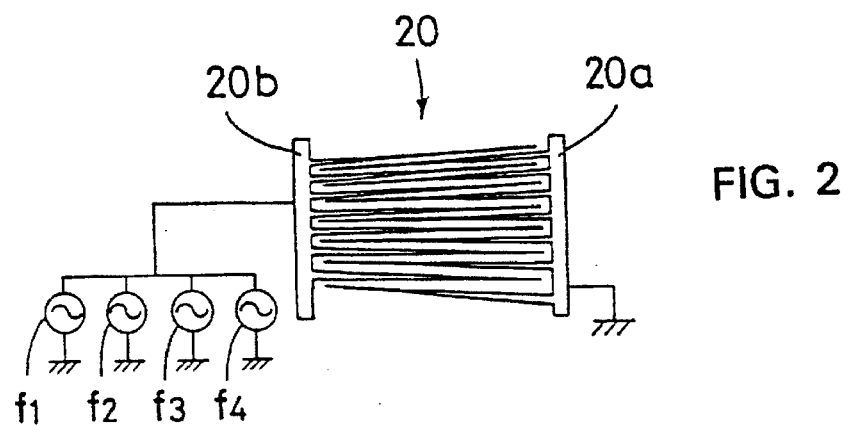
FIG. 2 is a diagram showing a main part of the preferred embodiment of FIG. 1.
Figure 3A:
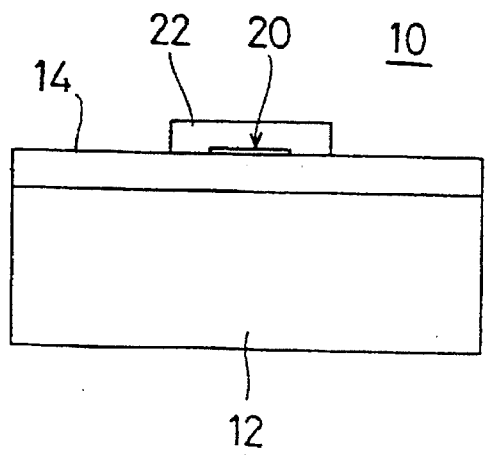
FIG. 3A is a diagram showing an end surface of the preferred embodiment of FIG. 1.

FIG. 1 is a perspective view showing a preferred embodiment according to the present invention, FIG. 2 is a diagram showing a main part of the preferred embodiment of FIG. 1, and FIG. 3A is a diagram showing an end surface of the preferred embodiment shown in FIG. 1. An acoustooptic device 10 contains a Y-cut and Z-propagation LiNbO₃ substrate 12. An optical waveguide layer, such as an optical waveguide layer 14 preferably formed of a Nb₂O₅ thin film, is located on one principal plane of the LiNbO₃ substrate 12. The optical waveguide layer 14 preferably has a higher light refractive index than the LiNbO₃ substrate 12. An input grating 16 is located on the principal plane of the light input side of the optical waveguide layer 14 so as to be substantially perpendicular to a light incident direction. An output grating 18 is located on the principal plane of the light output side of the optical waveguide layer 14 so as to be substantially parallel to the output grating 18. The input grating 16 and the output grating 18 collect spatial light beams into the optical waveguide and combine the collected spatial light beams. The input grating 16 and the output grating 18 are formed as plural grooves which are substantially parallel to one another, or formed of plural rod-shaped electrodes which are substantially parallel to one another.

Further, an interdigital electrode 20 is formed of Al or the like on the principal plane of the optical waveguide layer 14 so that a Rayleigh wave which is a kind of surface acoustic wave is excited at the intermediate portion between the input grating 16 and the output grating 18. The interdigital electrode 20 is formed of a pair of comb-shaped electrodes 20a and 20b which are mutually inserted into each other (interdigitated) as shown in FIG. 2. One comb-shaped electrode 20a is grounded while the other comb-shaped electrode 20b is connected to an oscillator for applying a frequency.

As shown in FIGS. 1 and 3A, a dielectric thin film layer 22 of ZnO, $Ta_2O_5$, or the like is formed on the interdigital electrode 20. In this preferred embodiment, a thin film layer of ZnO is formed as the dielectric thin film layer 22.

Figure 3B:
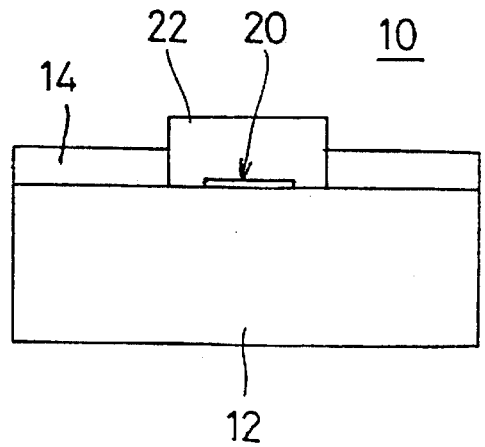
FIG. 3B is a diagram showing an end surface of another preferred embodiment of the present invention.

As shown in FIG. 3B, the interdigital electrode 20 may be located directly on the $LiNbO_3$ substrate 12. In this case, the optical waveguide layer 14 is provided on the $LiNbO_3$ substrate 12 at a location other than where the interdigital electrode 20 is located. In addition, although FIGS. 3A and 3B show the interdigital electrode 20 having side faces covered with the dielectric thin film layer 22, it is not necessary that the side faces be covered with the dielectric thin film layer 22.

In the acoustooptic device 10, a multi-frequency Rayleigh wave is excited by the interdigital electrode 20. One light beam is incident from a light source 24 into the optical waveguide layer 14 of the acoustooptic device 10. In this acoustooptic device 10, the incident light beam is diffracted by varying the frequency for excitation of the Rayleigh wave to thereby vary a light deflection angle.

By forming the dielectric thin film layer on the interdigital electrode, the electromechanical coupling factor is increased, and the excitation efficiency of the Rayleigh wave is enhanced. In addition, the frequency for the excitation of the Rayleigh wave is broadened. Further, when the dielectric thin film layer contains ZnO or $Ta_2O_5$, the electromechanical coupling efficiency is increased, the excitation efficiency of the Rayleigh wave is enhanced and the frequency band is broadened.

Figure 4:
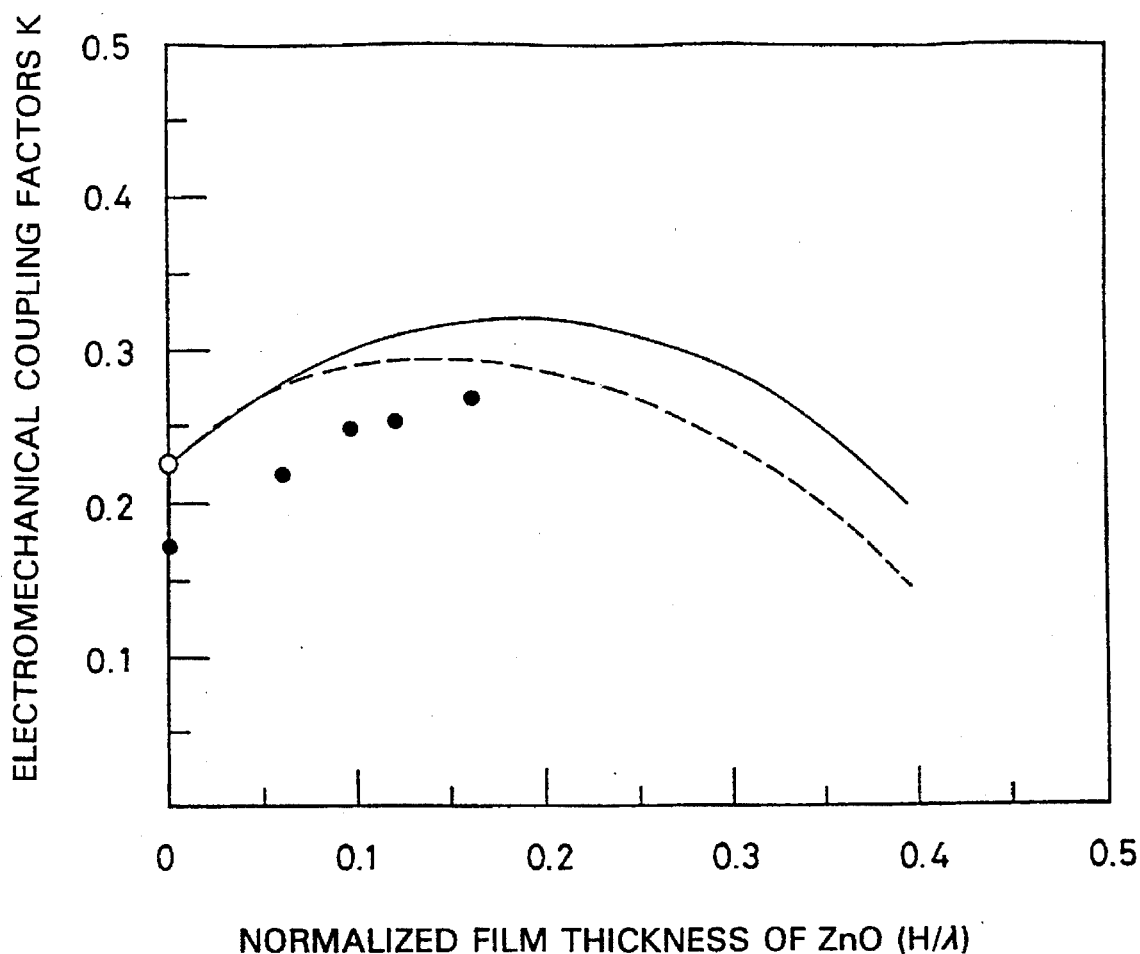
FIG. 4 is a graph showing the relationship between a normalized film thickness H/λ of ZnO serving as a dielectric thin film layer and an electromechanical coupling factor K in the preferred embodiment of FIG. 1.
Figure 5:
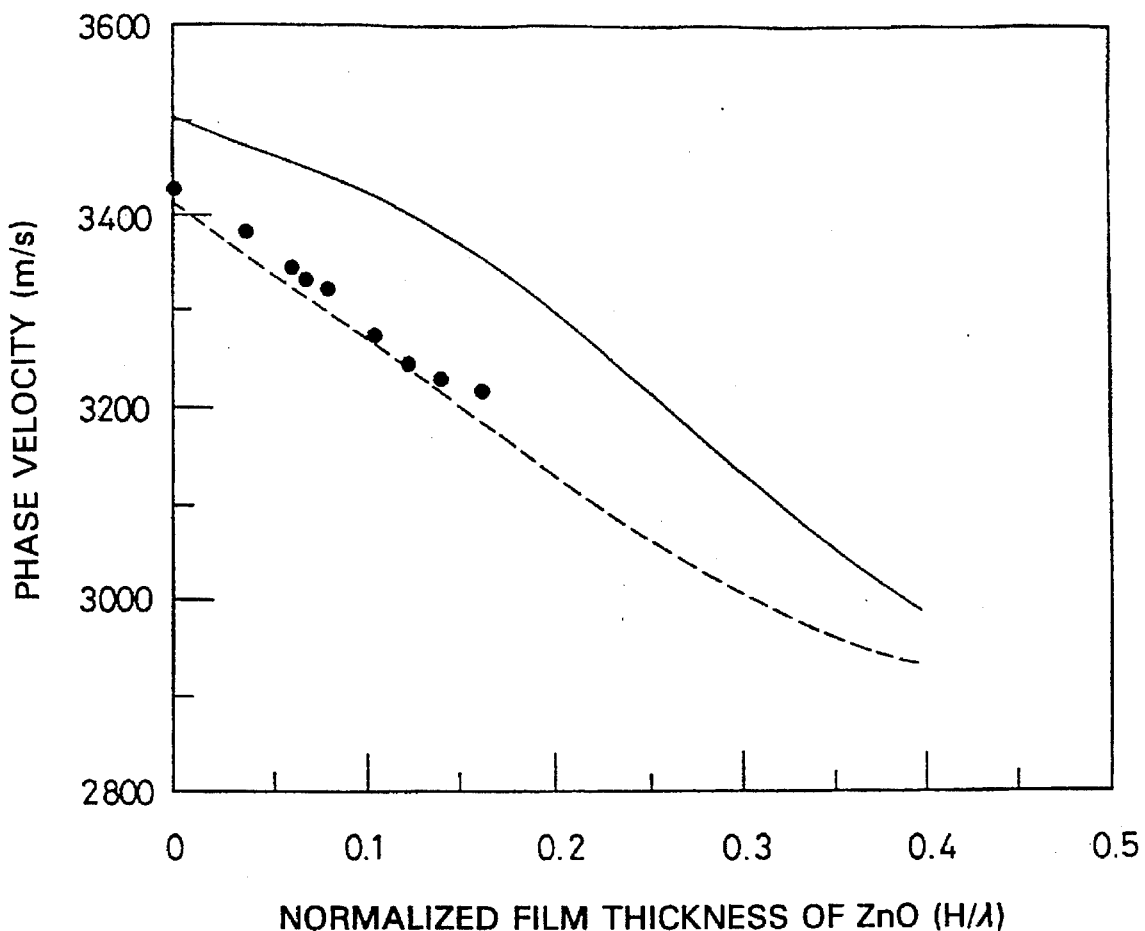
FIG. 5 is a graph showing the relationship between a normalized film thickness H/λ of ZnO serving as a dielectric thin film layer and a phase velocity in the preferred embodiment of FIG. 1.

FIG. 4 is a graph showing the relationship between the normalized film thickness of ZnO serving as the dielectric thin film layer and the electromechanical coupling factor. FIG. 5 is a graph showing the relationship between the normalized film thickness of ZnO serving as the dielectric thin film layer and the phase velocity. In FIGS. 4 and 5, the normalized film thickness is defined as $H/\lambda$ where H represents the film thickness of ZnO, and $\lambda$ represents the wavelength of excited Rayleigh wave. In this specification, "positive polarity" means a property wherein positive charges are generated by impacting the plane, and "negative polarity" means a property wherein negative charges are generated by impacting the plane. Further, in this specification, "+plane" means that the dielectric thin film layer is formed on the positive-polarity plane, and "–plane" means that the dielectric thin film layer is formed on the negative-polarity plane. In FIG. 4, a solid line represents calculation values of the relationship between the normalized film thickness of positive-polarity ZnO formed on the positive-polarity $LiNbO_3$ substrate 12 and the electromechanical coupling factor, and a broken line represents calculation values of the relationship between the normalized film thickness of positive-polarity ZnO formed on the negative-polarity $LiNbO_3$ substrate 12. Dots represent actually measured values of the relationship between the normalized film thickness of positive-polarity ZnO formed on the positive-polarity $LiNbO_3$ substrate 12 and the electromechanical coupling factor.

As is apparent from FIG. 4, in the case where the dielectric thin film layer 22 of the positive-polarity ZnO is formed on the positive plane and the normalized film thickness $H/\lambda$ thereof is greater than zero and equal to or less than about 0.37, the electromechanical coupling factor K is grater than that in the case of an interdigital electrode having no dielectric thin film layer (i.e., $H/\lambda=0$). On the other hand, in the case where the dielectric thin film layer 22 of the positive-polarity ZnO is formed on the negative plane and the normalized film thickness $H/\lambda$ thereof is greater than zero and equal to or less than about 0.32, the electromechanical coupling factor K is greater than that in the case of an interdigital electrode having no dielectric thin film layer.

For practical purposes, it is preferable that the normalized film thickness of ZnO serving as the dielectric thin film layer 22 is set to be within the range of about 0.05 to about 0.35 in the case where the polarity of the dielectric thin film layer is coincident with the polarity of the $LiNbO_3$ substrate. It is also preferable that the normalized film thickness of ZnO serving as the dielectric thin film layer 22 is set to be in the range of about 0.05 to about 0.27 in the case where the polarity of the dielectric thin film layer is different from the polarity of the $LiNbO_3$ substrate. In such cases, the electromechanical coupling factor K becomes about 1.2 times greater than that in the case of an interdigital electrode having no dielectric thin film layer.

Thus, the normalized film thickness $H/\lambda$ satisfies the relation of about $0<H/\lambda \leq 0.37$, the excitation efficiency of the Rayleigh wave is higher, and the frequency band for the excitation of the Rayleigh wave is broader. Accordingly, the variation of the light deflection angle is set to a larger value than that of the conventional acoustooptic device 1 by forming the acoustooptic device 10 so that the normalized film thickness of the dielectric thin film layer 22 of the acoustooptic device 10 is in the preferred range as described above. Therefore, according to this preferred embodiment, the acoustooptic device 10 having a high response, miniaturization, non-power and high reliability is provided.

The acoustooptic device 10 is usable as a light deflection device for a laser printer or the like. In this case, the device is respondent in a broad range, so that the variable width of the deflection angle can be set to a large value.

Further, the acoustooptic device 10 has a large variable width of the light deflection angle as described above. Accordingly, it has been adopted in the prior art that a light beam is deflected by a mechanical means such as a polygon mirror in a laser print or the like, whereas in the preferred embodiments of the present invention the acoustooptic device 10 can be used in place of such mechanical means.

Still further, according to the preferred embodiments of the present invention, the $LiNbO_3$ substrate 12 is not limited to the Y-cut and Z-propagation $LiNbO_3$ substrate, and the 128°-rotating Y-plane $LiNbO_3$ substrate may be used.

Figure 6:
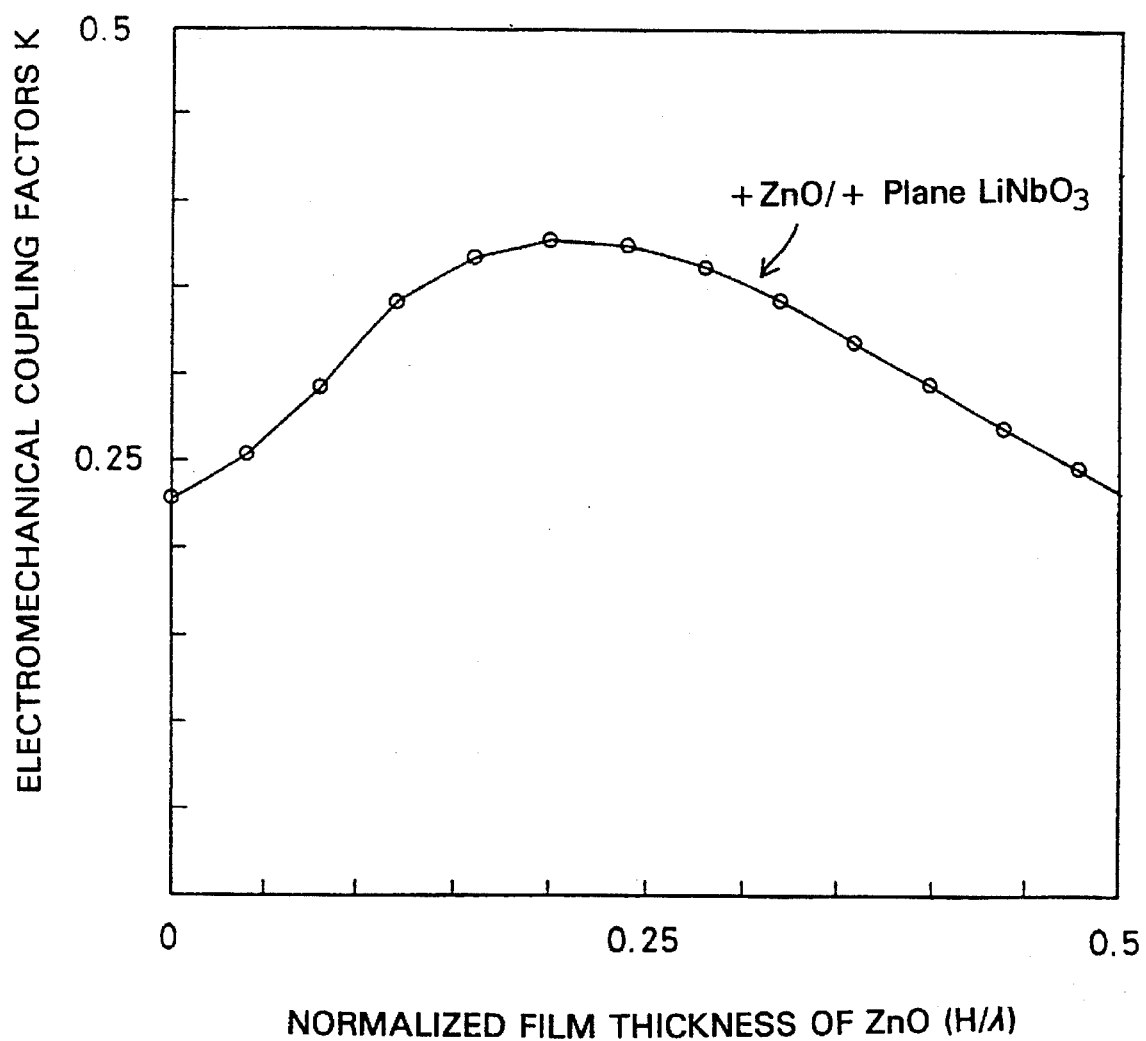
FIG. 6 is a graph showing the relationship between a normalized film thickness H/λ of ZnO serving as a dielectric thin film layer and an electromechanical coupling factor K in a an acoustooptic device using a 128°-rotating Y-plane LiNbO₃ substrate.
Figure 7:
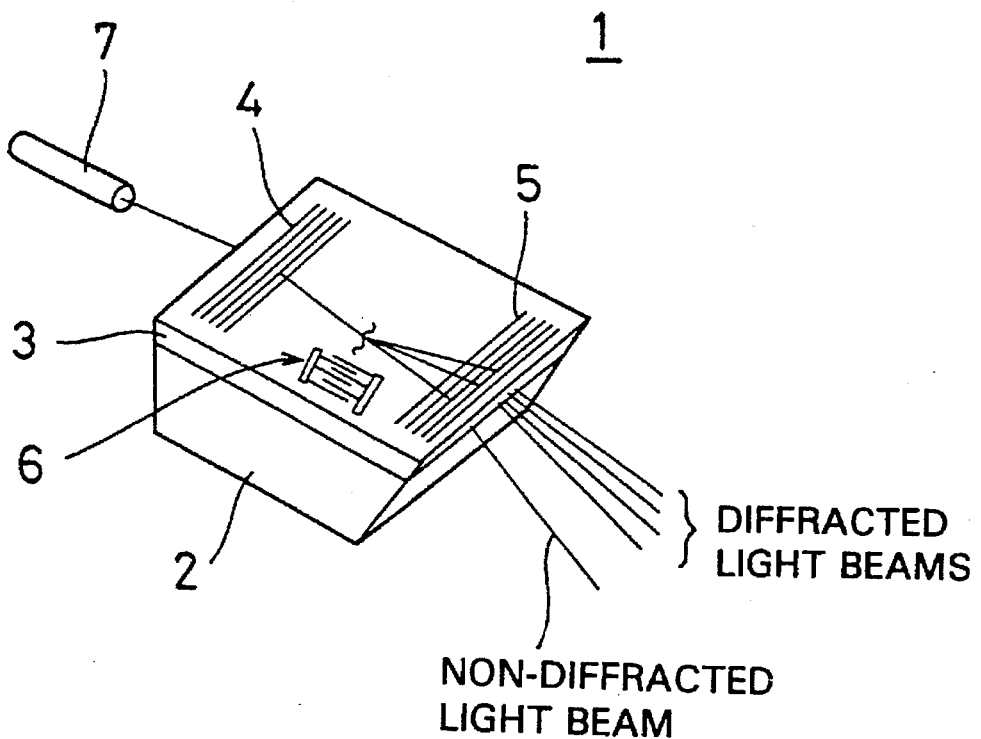
FIG. 7 is a perspective view showing a conventional acoustooptic device.
Figure 8:
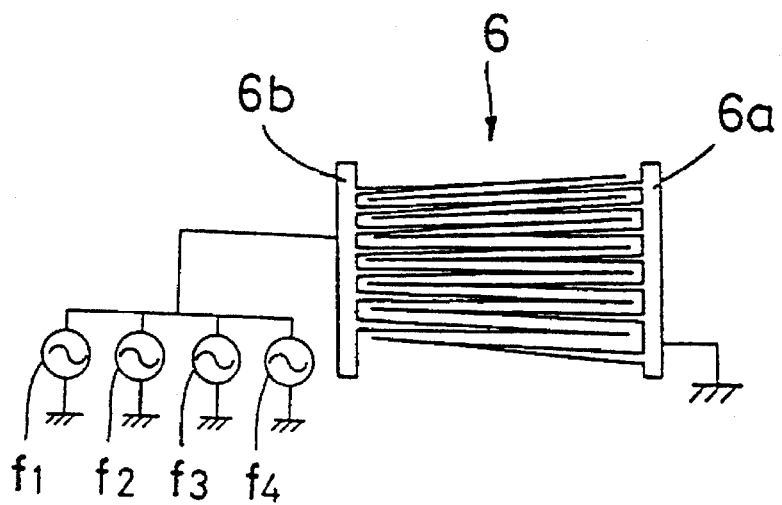
FIG. 8 is a diagram showing a main part of the conventional acoustooptic device of FIG. 7.

FIG. 6 is a graph showing the relationship between the normalized film thickness of ZnO serving as the dielectric thin film layer and the electromechanical coupling factor in the acoustooptic device using the 128°-rotating Y-plane $LiNbO_3$ substrate. In this case, the optical waveguide layer 14 is located on the 128°-rotating Y-plane $LiNbO_3$ substrate so that the upper surface of the optical waveguide layer 14 serves as the "+plane". Further, the interdigital electrode 20 of Al is formed on the +plane of the 128°-rotating Y-plane $LiNbO_3$ substrate, and the dielectric thin film layer 22 of ZnO is formed on the interdigital electrode 20. At this time, the dielectric thin film layer 22 is formed so that the +plane of ZnO is oriented in the same direction as the +plane of the 128°-rotating Y-plane $LiNbO_3$ substrate.

As shown in FIG. 6, in the case where the normalized film thickness $H/\lambda$ of ZnO serving as the dielectric thin film layer 22 is greater than zero and is about 0.5 or less, the electromechanical coupling factor K is grater than that in the case of an interdigital electrode having no dielectric thin film layer (i.e., $H/\lambda=0$). For practical purposes, it is preferable that the normalized film thickness of ZnO serving as the dielectric thin film layer 22 is set to be within the preferred range of about 0.08 to about 0.43, so that the electromechanical coupling factor K becomes about 1.2 times greater than that in the case of an interdigital electrode having no dielectric thin film layer.

Thus, in the case where the 128°-rotating Y-plane $LiNbO_3$ substrate is used, the normalized film thickness $H/\lambda$ satisfies the relation of about $0<H/\lambda \leq 0.5$, the excitation efficiency of the Rayleigh wave is larger, and the frequency band for the excitation of the Rayleigh wave is broader. Accordingly, in the case of the preferred embodiment shown in FIG. 6, by setting the normalized film thickness of the dielectric thin film layer 22 of the acoustooptic device 10 to be within the above preferred range, the variation width of the light deflection angle can be set to a larger value than that of the conventional acoustooptic device 1. Therefore, according to this preferred embodiment, the acoustooptic device 10 having a high response, miniaturization, non-power and high reliability is also provided.

Following Table 1 shows the structures of the above preferred embodiments and other preferred embodiments, and the relationship between the normalized film thickness of ZnO serving as the dielectric thin film and the electromechanical coupling factor. In Table 1, YZ-LN means that an optical waveguide layer is formed on a Y-cut and Z-propagation $LiNbO_3$ substrate, and 128Y-LN means that an optical waveguide layer is formed on a 128°-rotating Y-plane $LiNbO_3$ substrate. Al•IDT means that the interdigital electrode is formed of Al, and "/" means that a material at the left side of "/" is formed on a material at the right side of "/". Accordingly, for example, "+ZnO/Al•IDT/+YZ-LN" represents a structure having an interdigital electrode of Al formed on a $LiNbO_3$ substrate of +Y-plane, Y-cut and Z-propagation and a dielectric thin film having the same polarity formed on the interdigital electrode. Further, "+ZnO/Al•IDT/-YZ-" represents a structure that an interdigital electrode of Al is formed on a $LiNbO_3$ substrate of -Y-plane, Y-cut and Z-propagation on which an optical waveguide layer is formed, and a dielectric thin film layer having opposite polarity is formed on the interdigital electrode.

TABLE 1

| STRUCTURE | NORMALIZED FILM THICKNESS OF ZnO (H/λ) | ELECTRO-MECHANICAL COUPLING FACTOR: K |
|---|---|---|
| +ZnO/Al.IDT/+YZ—LN | 0.20 | 0.32 |
| -ZnO/Al.IDT/-YZ—LN | 0.20 | 0.32 |
| +ZnO/Al.IDT/-YZ—LN | 0.16 | 0.29 |
| -ZnO/Al.IDT/+YZ—LN | 0.16 | 0.29 |
| +ZnO/Al.IDT/+128Y—LN | 0.20 | 0.38 |
| -ZnO/Al.IDT/-128Y—LN | 0.20 | 0.38 |
| +ZnO/Al.IDT/-128Y—LN | 0.08 | 0.29 |
| -ZnO/Al.IDT/+128Y—LN | 0.08 | 0.29 |

As is apparent from the respective structures shown in Table 1, the electromechanical coupling factors which are larger than the conventional acoustooptic device (i.e., more than 0.23) can be obtained, and thus the same effect as the preferred embodiments as described above can be obtained. In addition, in the case where the polarity of the dielectric thin film layer is coincident with the polarity of the $LiNbO_3$ substrate (and the optical waveguide layer), the electromechanical coupling efficiency can be further increased. Thus, the excitation of the Rayleigh wave is enhanced and the frequency band can be broadened.

In the respective preferred embodiments, the optical waveguide layer is formed of $Nb_2O_5$, however, the optical waveguide layer may also be formed by diffusing Ti into one principal plane of the $LiNbO_3$ substrate or subjecting Ti to proton-exchange. Further, the optical waveguide layer may be formed on the whole surface of the $LiNbO_3$ substrate or on a part of the surface.

In the respective preferred embodiments, the dielectric thin film layer is preferably formed of ZnO. In place of ZnO, a thin film layer of $Ta_2O_5$ may be formed on the interdigital electrode. In this case, the same effect as described above can be obtained.

Although the present invention has been described in relation to particular preferred embodiments thereof, many other variations and modifications and other uses will become apparent to those skilled in the art. It is preferred, therefore, that the present invention be limited not by the specific disclosure herein, but only by the appended claims.

What is claimed is:

1. An acoustooptic device comprising:

a Y-cut and Z-propagation $LiNbO_3$ substrate;

an optical waveguide layer located on at least a portion of said $LiNbO_3$ substrate and having a higher light refractive index than said $LiNbO_3$ substrate;

an interdigital electrode located on said $LiNbO_3$ substrate for generating Rayleigh waves; and a dielectric thin film layer located on said interdigital electrode.

2. The acoustooptic device as claimed in claim 1, wherein said dielectric thin film layer contains at least one of ZnO and $Ta_2O_5$.

3. The acoustooptic device as claimed in claim 1, wherein a polarity of said dielectric thin film layer is coincident with a polarity of said $LiNbO_3$ substrate on confronting surfaces of said dielectric thin film layer and said $LiNbO_3$ substrate.

4. The acoustooptic device as claimed in claim 1, wherein a normalized film thickness of the dielectric thin film layer is equal to about 0.37 or less.

5. The acoustooptic device as claimed in claim 1, wherein said optical waveguide layer contains $Nb_2O_5$.

6. The acoustooptic device as claimed in claim 1, wherein said optical waveguide layer is formed by diffusing Ti into one principal plane of said $LiNbO_3$ substrate.

7. The acoustooptic device as claimed in claim 1, wherein said optical waveguide layer is formed by subjecting Ti to proton exchange on one principal plane of said $LiNbO_3$ substrate.

8. An acoustooptic device including:

a 128°-rotating Y-plane $LiNbO_3$ substrate;

an optical waveguide layer located on at least said 128°-rotating and Y-plane $LiNbO_3$ substrate and having a light refractive index higher than said 128°-rotating and Y-plane $LiNbO_3$ substrate;

an interdigital electrode located on said 128°-rotating Y-plane $LiNbO_3$ for generating a Rayleigh waveform; and a dielectric thin film layer located on said interdigital electrode.

9. The acoustooptic device as claimed in claim 8, wherein said dielectric thin film layer contains at least one of ZnO and $Ta_2O_5$.

10. The acoustooptic device as claimed in claim 8, wherein a polarity of said dielectric thin film layer is coincident with a polarity of said 128°-rotating Y-plane $LiNbO_3$ substrate.

11. The acoustooptic device as claimed in claim 8, wherein a normalized film thickness of said dielectric thin film layer is within a range of about 0.5 or less.

* * * * *